(12) United States Patent
Syrjärinne et al.

(10) Patent No.: US 6,812,887 B2
(45) Date of Patent: Nov. 2, 2004

(54) METHOD AND APPARATUS FOR SAVING POWER IN A GLOBAL POSITIONING SYSTEM RECEIVER

(75) Inventors: Jari Syrjärinne, Tampere (FI); Harri Valio, Lempäälä (FI)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 10/016,139

(22) Filed: Dec. 12, 2001

(65) Prior Publication Data

US 2003/0107514 A1 Jun. 12, 2003

(51) Int. Cl.$^7$ .............................................. H04B 7/185
(52) U.S. Cl. ............................ 342/357.12; 342/357.09
(58) Field of Search ...................... 342/357.06, 357.09, 342/357.1, 357.12

(56) References Cited

U.S. PATENT DOCUMENTS

| | | | |
|---|---|---|---|
| 4,535,625 A | 8/1985 | Lyle, Jr. | |
| 5,144,595 A | 9/1992 | Graham et al. | |
| 5,355,316 A | 10/1994 | Knobbe | |
| 5,381,095 A | 1/1995 | Andrews | |
| 5,506,817 A | 4/1996 | O'Brien, Jr. | |
| 5,511,042 A | 4/1996 | O'Brien, Jr. | |
| 5,525,995 A | 6/1996 | Benner | |
| 5,537,368 A | 7/1996 | O'Brien, Jr. et al. | |
| 5,592,173 A | * 1/1997 | Lau et al. | 342/357.12 |
| 5,650,785 A | * 7/1997 | Rodal | 342/357.12 |
| 5,752,218 A | * 5/1998 | Harrison et al. | 342/357.07 |
| 5,864,315 A | * 1/1999 | Welles et al. | 342/357.12 |
| 5,883,594 A | * 3/1999 | Lau | 342/357.1 |
| 5,883,595 A | 3/1999 | Colley | |
| 5,902,351 A | 5/1999 | Streit et al. | |
| 5,995,042 A | * 11/1999 | Durboraw et al. | 342/357.12 |
| 6,028,887 A | * 2/2000 | Harrison et al. | 342/357.06 |
| 6,127,968 A | 10/2000 | Lu | |
| 6,133,871 A | * 10/2000 | Krasner | 342/357.06 |
| 6,266,533 B1 | 7/2001 | Zadeh et al. | |
| 6,285,315 B1 | 9/2001 | Pratt | |

FOREIGN PATENT DOCUMENTS

EP 1 102 397 A2 * 5/2001 .......... H03H/17/02

OTHER PUBLICATIONS

Enhanced accuracy GPS navigation using the interacting multiple model estimator, X. Lin et al., IEEE Proceedings of the 2001 Aerospace Conference, vol. 4, p. 1911–1923, 2001.*

Using IMM adaptive estimator in GPS positioning, G. Chen et al., Proceedings of the 40th SICE Annual Conference, International Session Papers, p. 78–83, 2001.*

(List continued on next page.)

Primary Examiner—Gregory C. Issing
Assistant Examiner—Fred H. Mull
(74) Attorney, Agent, or Firm—Ware, Fressola, Van Der Sluys & Adolphson LLP

(57) ABSTRACT

A method and apparatus for conserving power in a positioning system receiver using ranging signals to determine a state of motion of the receiver, the method including: a step (32) of performing at least a predetermined number of solutions of the state of motion of the receiver using a filter solution based on a variable mix of models of the motion of the receiver, and of providing the model mix used in each solution; and a step (35) of adopting a partial duty cycle indicating a percentage of time selected receiver components are powered on, based on the mix of models used in successive solutions. Typically, the receiver includes a radiofrequency (RF) front end module and a baseband processor module and the selected components that are powered on and off to save power typically include the RF front end module and the baseband processor module.

8 Claims, 3 Drawing Sheets

OTHER PUBLICATIONS

S. Bancroft (1985), "*An Algebraic Solution of the GPS Equations,*" IEEE Transactions on Aerospace and Electronic Systems, vol. 21 (7), Jan. 1985.

A. Houles and Y. Bar–Shalom (1989), "*Multisensor Tracking of a Maneuvering Target in Clutter,*" IEEE Transactions on Aerospace and Electronic Systems, vol. 25 (2), Mar. 1989.

F. Dufour and M. Mariton (1991), "*Tracking a 3D Maneuvering Target With Passive Sensors,*" IEEE Transactions on Aerospace and Electronic Systems, vol. 27 (4), Jul. 1991.

J. Chaffee and J. Abel (1992), "*The GPS Filtering Problem,*" IEEE Position, Location and Navigation Symposium 1992.

J. Chaffee, J. Abel and B. McQuiston (1993), "*GPS Positioning, Filtering and Integration,*" IEEE Aerospace and Electronics Conference 1993.

Yaakov Bar–Shalom (1995), "*Multitarget–Multisensor Tracking Principles and Techniques,*" NMP Research and Technology, pp. 1, 46 and 20.

Elliot D. Kaplan (1996), "*Understanding GPS: Principles and Applications,*" Artech House Publisher, 1996, pp. 25–27.

Greg Welch and Gary Bishop (1997), "*An Introduction to the Kalman Filter,*" University of North Carolina at Chapel Hill, Department of Computer Science, Chapel Hill, North Carolina, USA, TR95–041, Sep. 17, 1997.

Jiao Shuhong, Si Xicai and Kong Fanru (1998), "*A Time–of–Arrival Location for Maneuvering Target on Two–Dimensional Surface,*" Signal Processing Proceedings 1998, ICSP98, Fourth International Conference vol. 2, 1998, pp. 1700–1703.

Nathan A. White, Peter S. Maybeck and Stewart L. DeVilbiss (1998), "*Detection of Interference/Jamming and Spoofing in a DGPS–Aided Inertial System,* " IEEE Transactions on Aerospace and Electronic Systems, vol. 34, No. 4, Oct. 1998, pp. 1208–1217.

M. Phatak, M. Chansarkar and S. Kohli (1999), "*Position Fix From Three GPS Satellites and Altitude: A Direct Method,*" IEEE Transactions on Aerospace and Electronic Systems, vol. 35 (1), Jan. 1999.

Jari Syrjärinne and Paula Korvenoja (2001) "*Nano R1 Navigation Filter,*" Nokia Mobile Phones, Sep. 5, 2001.

\* cited by examiner

METHOD AND APPARATUS FOR SAVING POWER IN A GLOBAL POSITIONING SYSTEM RECEIVER

CROSS-REFERENCE TO RELATED APPLICATIONS

The following applications are owned by the assignee of the present application and are hereby incorporated by reference in their entirety.

U.S. application Ser. No. 09/444,584 entitled Multiple Model Navigation Filter for Hybrid Positioning, filed Nov. 22, 1999; and U.S. application Ser. No. 09/864,080 entitled Two-Stage Interacting Multiple Models Filter, filed May 23, 2001.

FIELD OF THE INVENTION

The invention relates to positioning systems, such as the well known global positioning system, and more particularly to power consumption in receivers of signals transmitted by reference elements of such positioning systems, such as the satellites of the global positioning system.

BACKGROUND OF THE INVENTION

In satellite positioning systems (such as the global positioning system or GPS), the position of a receiver (user) and its time offset from the system time (i.e. the correction to the receiver time at which the receiver is determined to be at the determined position) can be determined by using (pseudorange) measurements obtained from information (ephemerides and C/A-code phases) provided from at least four satellites. Such a determination can use satellite measurements at a particular instant of time, in what is called a single-point solution, a solution that in no way takes into account past information obtained from the satellites; any error in the measurements obtained from the satellites, including error from noise or multi-path, is reflected in such a single-point solution.

Filtering with a Kalman filter (or some modification of such a filter) can instead be used to enhance the quality of the receiver's estimated track (by providing smoother, less noisy solutions than are provided by a single-point solution), and also to provide useable solutions in periods when satellite measurements are not available (because of poor signal conditions). The performance of any such filter is dependent on how the receiver's motion is modeled in the filter.

Usually, instead of using an ordinary Kalman filter, what is called an extended Kalman filter (EKF), which is a linearized form of Kalman filter, is used, because a standard Kalman filter assumes that the measurement update equations are linear, and for positioning problems the measurement update equations, which involve the pseudoranges, are nonlinear. For a (standard) Kalman filter to be used, there has to be a linear relationship between the measurement vector m and state vector s, such that m=H·s, where H is some matrix. In GPS positioning, if the state vector is for example of the form [x y z t], where (x,y,z) indicates position and t represents clock bias, there is no such linear equation between pseudorange measurements and state. Instead, the $i^{th}$ component of the measurement vector (i.e. the pseudorange from the $i^{th}$ satellite), is given by $$m(i) = \sqrt{(x_i-x)^2 + (y_i-y)^2 + (z_i-z)^2} + \Delta t,$$

(where $\Delta t$ is a clock error/bias term) which is obviously not a linear relationship. In an EKF, to be able to still use a Kalman type filter in an application where such a nonlinear relationship exists, the nonlinear relationship is approximated by a linear relationship by forming a truncated Taylor series of the nonlinear equation and taking the first, linear term of the series. In practice, this means that the H matrix in the equation m=H·s is approximated by the so-called Jacobian (known in the art) of the pseudorange equations.

Thus, in an EKF, a standard Kalman filter (for linear systems) is applied to nonlinear systems (with additive white noise) by continually updating a linearization around a previous state estimate, starting with an initial guess. In other words, a linear Taylor series approximation (no nonlinear terms) of the system function at the previous state estimate is made, and a linear Taylor series approximation of the observation function at the corresponding predicted position. Such an approach yields a relatively simple and efficient algorithm for handling a nonlinear model, but convergence to a reasonable estimate depends to a great extent on the accuracy of the initial guess at the desired position; the algorithm may not converge if the initial guess is poor or if disturbances to the motion are so large that linearization is inadequate to describe the system.

The prior art also teaches using what is called the interacting multiple model (IMM) solution, in which various multiple models are assumed for the motion of the receiver (modules assuming slow turning, fast turning, slow accelerating, fast accelerating, and so on), and the outputs of the different models are combined based on weights that take into account how the predictions of the model agree with later measurements made on the basis of later information received from the satellites.

In such an approach, each model (branch of the IMM solution) is implemented as an EKF.

GPS satellites broadcast navigation data (including their ephemerides and health information) using a direct sequence spread spectrum signal. Doing so allows all of the satellites to share the same frequency spectrum. Each satellite modulates the same carrier frequency with a pseudorandom number (PRN) code (via binary phase shift key modulation) as well as with the navigation data for the satellite. A GPS receiver must acquire and track the signal from a GPS satellite in order to read the navigation data from the satellite. The acquisition and tracking of a GPS signal for a particular one of the GPS satellites amounts to synchronizing the received PRN code for the GPS satellite (obtained from the received signal after removing the carrier frequency) with a replica of the PRN code generated by the GPS receiver. A correlator determines at what relative position the replica PRN code is in phase with the received PRN code.

When a GPS receiver is integrated into a mobile phone, power consumption by the mobile phone is significantly increased. Since only a limited reservoir of power is available, every module inside a mobile phone should consume as little power as possible. Besides a GPS module and the required cellular transceiver module, examples of modules that could be included in a mobile phone are a so-called BlueTooth receiver module, a WLAN (wireless local area network) module, and a camera module.

There are many ways to reduce power-consumption of a mobile phone having component modules, such as miniaturizing the component modules, selecting more power-efficient component modules, and shutting down (temporarily) a component module partially (i.e. shutting down some parts of the component module) or completely (shutting down the component module entirely). Of course a partial or complete shutdown of a component module is possible only if an acceptable level of service can still be provided by the affected component module.

What is needed is a way to reduce power consumption by a GPS receiver without significantly degrading performance of the GPS receiver positioning function. Such a way to reduce power consumption would be especially advantageous in case of a GPS receiver operating as a component of a mobile phone.

SUMMARY OF THE INVENTION

Accordingly, a first aspect of the invention provides a method for conserving power in a positioning system receiver used in connection with a positioning system providing ranging signals, the receiver using the ranging signals to determine a state of motion of the receiver, the method including: a step of performing at least a predetermined number of solutions of the state of motion of the receiver using a filter solution based on a mix of models of the motion of the receiver, a mix that is varied from one solution to the next according to a predetermined criteria, and of providing the model mix used in each solution; and a step of adopting a partial duty cycle indicating a percentage of time selected receiver components are powered on, based on the mix of models used in successive solutions.

In accord with the first aspect of the invention, the receiver may include a radiofrequency (RF) front end module and a baseband processor module and the selected components may include the RF front end module. Further, the selected components may also include the baseband processor module.

In a second aspect of the invention, an apparatus is provided for conserving power in a positioning system receiver used in connection with a positioning system issuing ranging signals, the receiver using the ranging signals to determine a state of motion of the receiver, the apparatus including: means for performing at least a predetermined number of solutions of the state of motion of the receiver using a filter solution based on a mix of models of the motion of the receiver that are varied from one solution to the next according to a predetermined criteria, and for providing the model mix used in each solution; and means for determining a partial duty cycle indicating a percentage of time selected receiver components are powered on, based on the mix of models used in successive solutions.

In accord with the second aspect of the invention, the receiver may include a radiofrequency (RF) front end module and a baseband processor module and the selected components may include the RF front end module. Further, the selected components may also include the baseband processor module.

In a third aspect of the invention, a system is provided, including: a transmitter for transmitting a ranging signal, and a ranging receiver for receiving the ranging signal and for determining a state of motion of the ranging receiver, the ranging receiver characterized in that it includes an apparatus for conserving power that in turn includes: means for performing at least a predetermined number of solutions of the state of motion of the ranging receiver using a filter solution based on a mix of models of the motion of the ranging receiver that are varied from one solution to the next according to a predetermined criteria, and for providing the model mix used in each solution; and means for determining a partial duty cycle indicating a percentage of time selected ranging receiver components are powered on, based on the mix of models used in successive solutions.

In accord with the third aspect of the invention, the system may also include a computing resource external to the ranging receiver, and the apparatus may communicate information to the computing facility via a wireless communication system and the computing facility may use the information in assisting the apparatus in performing at least a predetermined number of solutions of the state of motion of the ranging receiver using a filter solution based on a mix of models of the motion of the ranging receiver that are varied from one solution to the next according to a predetermined criteria.

By allowing some component of a ranging receiver (i.e. the receiver front end and baseband processing module) to be turned on and off during operation of the ranging receiver, the invention allows substantial savings in power compared to what is provided by the prior art, which does not teach turning on and off components of a ranging receiver. The savings can amount to a reduction in power used by the components turned on and off for example in some embodiments by as much as a factor of from two to fifty. For example, a ranging receiver using the invention can have its receiver front end and baseband processing module powered on only 300 ms out of every other second, for a reduction in power by a factor of six (2000 ms/300 ms), or the selected receiver components could be turned on only every 100 ms every five seconds, for a reduction in power of a factor of 50 (5000 ms/100 ms).

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention is described below in the context of a global positioning system (GPS) receiver embedded in a mobile phone. It should be understood however, that the invention is of use in case of any positioning system based on beacons providing ranging signals useful in positioning or otherwise estimating the state of motion of a receiver of the ranging signals, including for example land-based beacons such as cellular base stations.

The invention provides a method and corresponding apparatus for reducing the power consumed by a GPS receiver without significantly degrading the performance of the GPS receiver.

The invention is based on periodically shutting down a GPS receiver's low-level hardware used to acquire, track, and process ranging signals from the GPS satellites (including extracting navigation data and pseudorange information from the ranging signals), and estimating the user's position, velocity and time (PVT) using a motion-modeling filter, such as the Interacting Multiple Models (IMM) filter, to provide PVT solutions both during shut-down and during power-on, which can then provide acceptably accurate PVT solutions even during shut-down. The estimated PVT solutions are used not only for providing continuous position information for the user, but also for speeding up GPS satellite signal reacquisition by using the estimated PVT as the basis for very accurate initial estimates of code and carrier phase.

Figure 1:
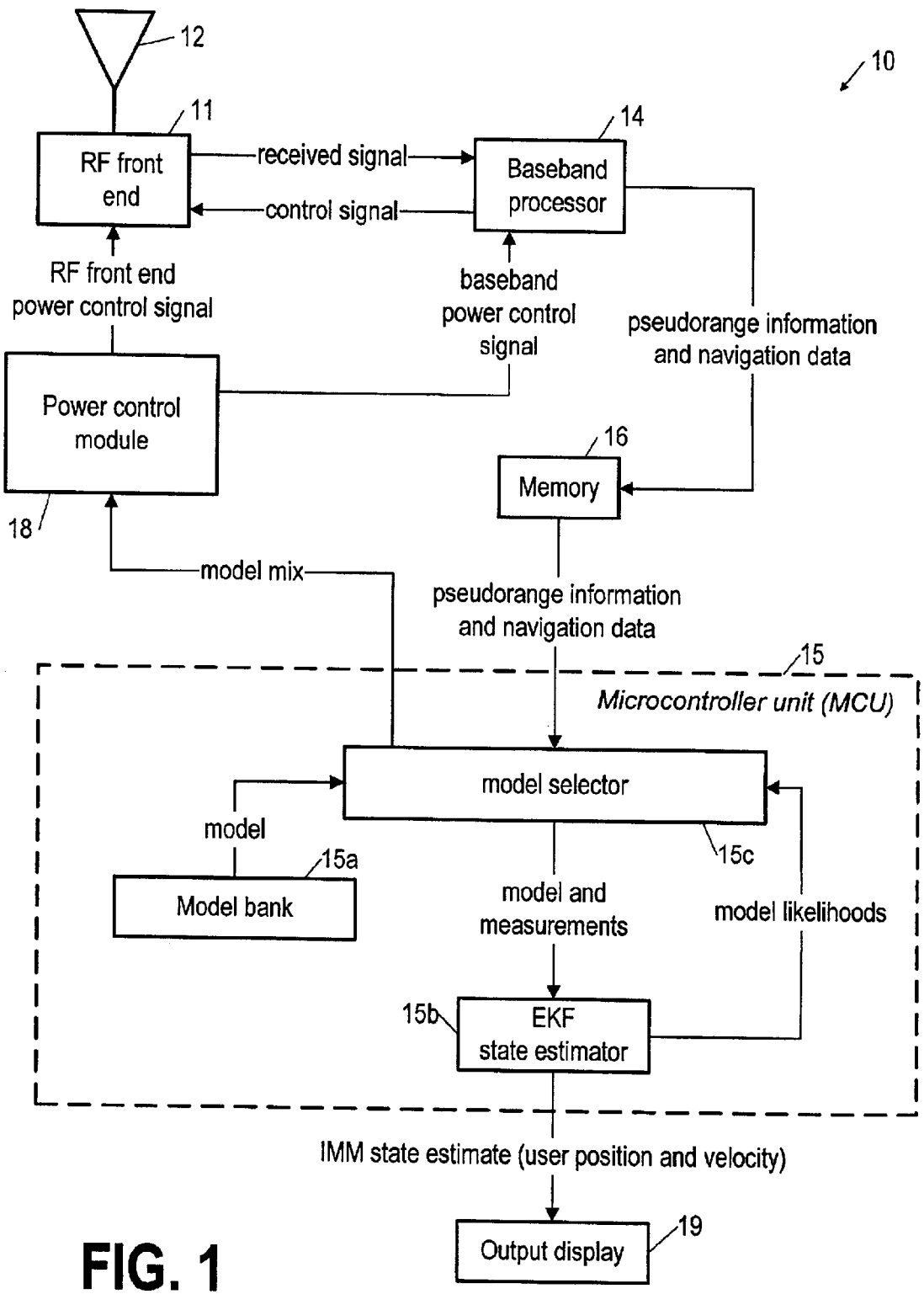
FIG. 1 is a block diagram of a GPS receiver according to the invention.

Referring now to FIG. 1, a GPS receiver 10 that can be adapted to implement the invention is shown as including an antenna 12 coupled to a GPS radiofrequency (RF) front end 11 for acquiring GPS satellite signals, a baseband processor 14 for closing the signal tracking loops, for extracting from the received signal navigation data and what is here called, collectively, pseudorange information, including coarse acquisition (C/A) code phase measurements, residual Doppler frequency measurements and/or integrated carrier phase measurements (in good signal conditions), and also for controlling the RF front end, and a micro controller unit (MCU) 15 containing the position calculation functionality (including functionality for PRN code phase and carrier frequency prediction calculations based on the estimated PVT). The GPS RF front end 11 and the baseband processor 14 are required in order to make pseudorange measurements, the baseband processor providing raw pseudorange measurements (the pseudorange information described above), which are used by the MCU 15 to provide actual pseudoranges. The pseudoranges in turn are used by the MCU in determining the PVT solution. The baseband processor provides the data it extracts from the received signals (pseudorange information and navigation data) to the MCU via a memory 16, i.e. the baseband processor writes the information to the memory 16, and the MCU reads the information from the memory, as needed. (The information can be sent also as a message, and in that case no special memory is needed.) Finally, the GPS receiver includes a power control module 18 that determines the fraction of time to shut down the RF front end and the fraction of time to shut down the baseband processor based on monitoring the model mix used by the MCU (which is provided to the power control module by the MCU). The operation of the power control module 18 is described in more detail below in connection with FIG. 3.

A typical GPS receiver performs a position calculation once each second, i.e. at a rate of 1 Hz. To provide acceptable pseudorange measurements for a position calculation typically requires from 200 to 400 ms of operation by the baseband processor and RF baseband processor. In principle, this means, that the GPS RF front end and the baseband processor of a typical GPS receiver could be powered off for a period ranging from 600 to 800 ms out of every second of operation without having any effect on the quality of the position determination provided by the GPS receiver.

Ideally, in order to power off the RF front end and baseband processor, the GPS receiver should have the current navigation data in the memory 16 (and the MCU control logic should be able to provide the baseband processor 14 with good initial tracking loop values for quick signal reacquisition). The better the position and current GPS time maintained in the MCU (via the IMM-based PVT solution), the better the initial values the MCU can provide as inputs to the tracking loop, the longer the power down period can be, and the shorter the measurement period can be. Using an IMM-based PVT solution, the savings in power consumption can be significant, since most of the GPS RF components and the baseband processor can be powered off during the power down period, and the power consumption by these components is significant.

The key issue in tracking loop initialization is the quality of the estimated position. The use of an IMM filter makes it possible to model the motion of the user more accurately than would be possible using a standard Kalman filter or a simple point-wise solution (i.e. a solution that does not take into account other than a current pseudorange measurement).

Figure 2:
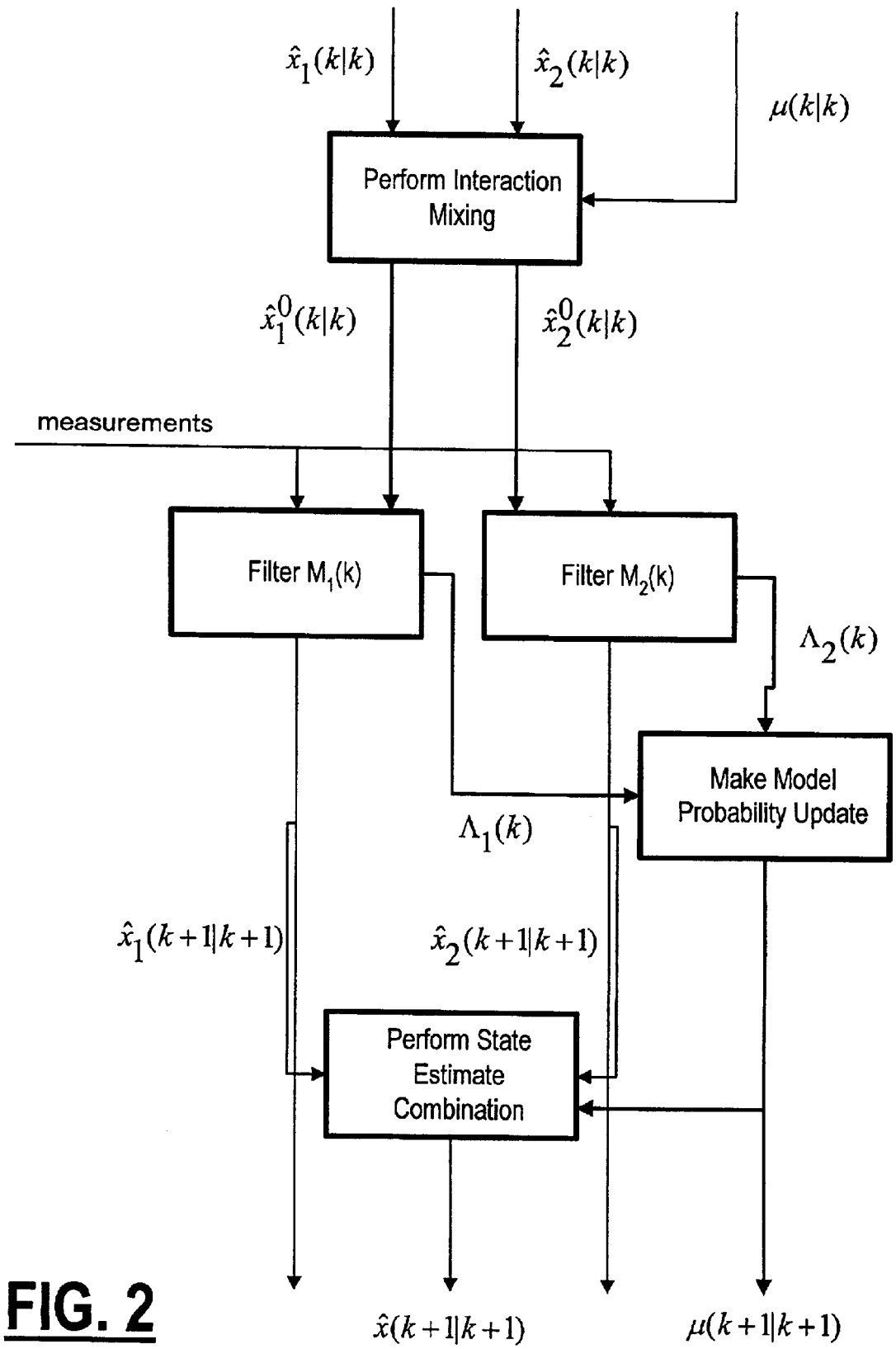
FIG. 2 is a flow chart illustrating Interacting Multiple Model (IMM) control logic.

The principle of the IMM approach to providing PVT solutions is described in U.S. application Ser. No. 09/444, 584 entitled Multiple Model Navigation Filter for Hybrid Positioning, filed Nov. 22, 1999, (incorporated by reference above). A motion model is a presumption of how the user's motion can best be modeled. Referring to FIG. 1 again, an MCU 15 hosting control logic that implements an IMM-based PVT solution includes a database 15a of motion models, called a model bank, an extended Kalman filter (EKF) state estimator 15b, and a model selector 15c (an underlying Markov chain) for selecting one or another of the motion models and for controlling the overall model combination, i.e. the way that the predictions of tracks according to different models are combined. The models of the model bank 15a may vary greatly from each other, i.e. some might model time-dependent non-linear maneuvers and others might model simple uniform linear motion. The Markov chain (model selector) 15c is defined by a fixed and pre-determined probability transition matrix M. Although only a single EKF state estimator is shown in FIG. 1, if multiple tracks are combined for a segment of motion of the receiver, sometimes a different EKF estimator will be used for each model. For each motion model used in an IMM solution, a quality of fit value is calculated from a weighted sum of the solution provided by each model with the weighting based on a measurement residual for each model indicating the closeness of the solution provided by the model (i.e. the state predicted by the model) to the measured state. The closer the measurement (that is, the smaller the residual), the better the model fits the actual motion and the greater is its contribution. The model-wise quality of fit values are here called model likelihoods. They are calculated by the EKF state estimator 15b and provided to the model selector 15c, as indicated in FIG. 1. Referring now to FIG. 2, a flow diagram of IMM is shown, indicating that the GPS receiver 10 (FIG. 1) is able to use a combination of one or more selected models for any given segment of motion. FIG. 2 illustrates mixing only two models, based on a mixing parameter $\mu(k)$, although in principle any number of models can be mixed. In case of for example two models, as shown in FIG. 2, two different EKF filters can be used, each providing a state estimate according to its model. Sometimes, however, a single EKF filter is used to provide a state estimate for each model in turn.

In an exemplary application of the invention, a pedestrian can be standing in one location for a relatively long time. In such a situation, the static model of the IMM filter (i.e. a model assuming a null user velocity) is the most appropriate model and is in fact particularly appropriate, and so the shutdown time for all or some of the low-level hardware of the receiver can be as long as up to two or three seconds. In such a shutdown period, it is highly unlikely that the pedestrian will move far from the pedestrian's location at the beginning of the shutdown period. Once motion is detected (i.e. the probability of the constant velocity model or acceleration model becomes dominant), the power-on time can be extended to for example one half a second.

As another example, in case of the use of a GPS receiver in a moving car, if the receiver is detected to move with constant velocity, the estimation of the predicted code and carrier phase becomes very reliable (just as in the static case). Therefore, once a constant velocity is detected, the shutdown period can be made suitably long, and only reduced when a positive or negative acceleration is detected.

Figure 3:
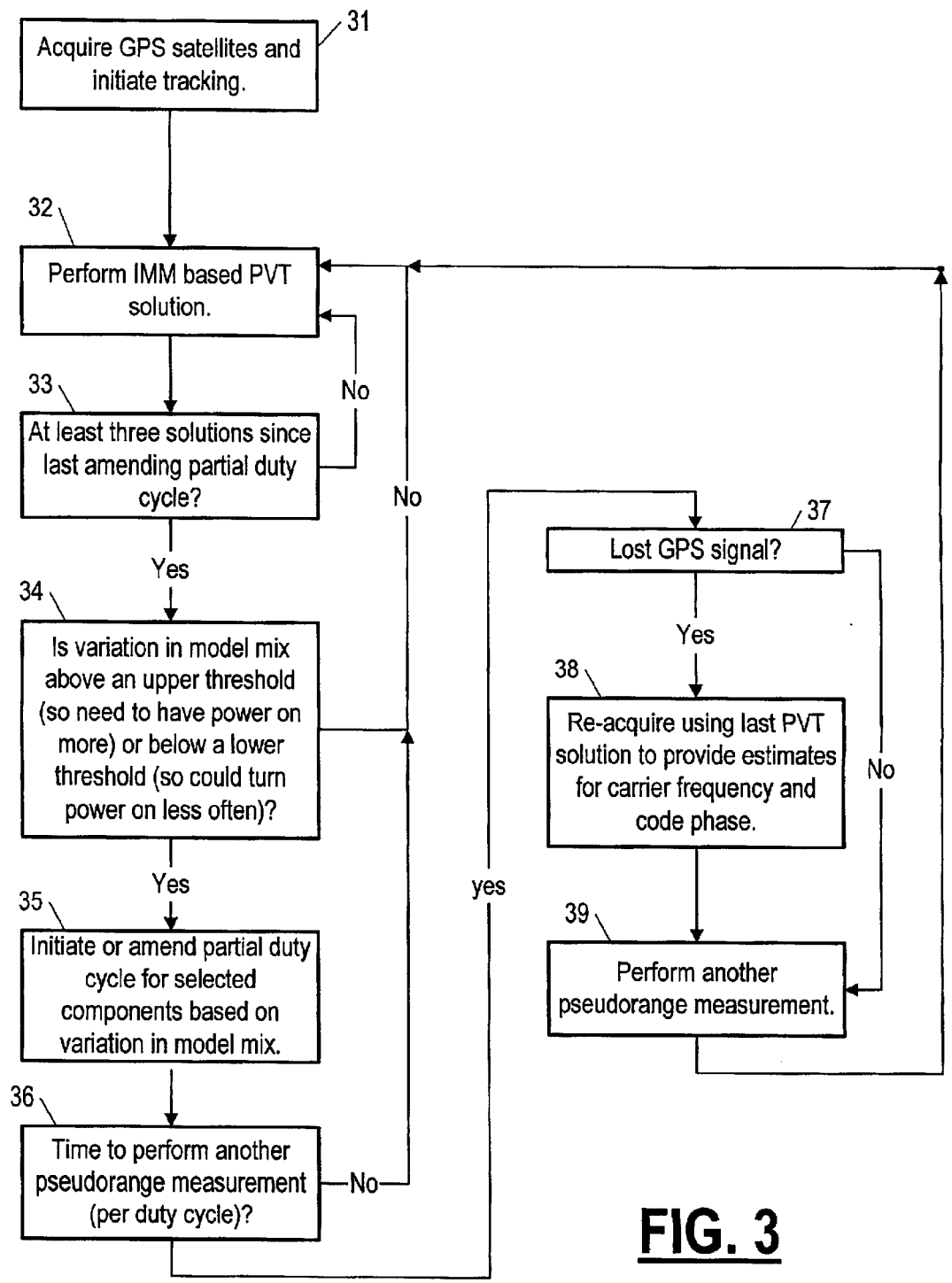
FIG. 3 is a flowchart indicating GPS receiver operation according to the invention.

Referring now to FIG. 3 and also to FIG. 1, a flowchart illustrating aspects of GPS receiver operation according to the invention is shown as including a first step 31 in which the GPS receiver acquires the ranging signals of a suitable number of GPS satellites and then initiates tracking (making fine adjustments to the carrier frequency and code phase for each of the acquired satellite signals). In a next step 32, the GPS receiver performs a PVT solution using the IMM procedure (as set out e.g. in FIG. 2). The MCU 15 of the GPS receiver continues providing PVT solutions, and the power control module 18 counts the number of PVT solutions thus provided. The power control module also keeps track of the model mix being used by the MCU (based on information it receives from the MCU during each PVT solution, as indicated in FIG. 1). In a next, decision step 33, with each PVT solution, the MCU determines whether the MCU has provided at least a predetermined number of PVT solutions (for example three) since the MCU last issued a power adjustment command, and if so, in a followup decision step 34, the MCU determines whether the model mix used in determining the PVT solutions has varied either too much (above an upper threshold) so that the power use should be increased, or varied so little (below a lower threshold) that power use can be further cut back. If a sufficient number of PVT solutions have been provided to make a decision about power control (e.g. three solutions), and the model mix is in a range indicating a change in power use, then in a next step 35 the power control module will initiate a partial duty cycle for selected components or amend an already instituted partial duty cycle to provide an even greater power-off fraction. The initial partial duty cycle is predetermined, and in later amending the partial duty cycle, the power control module follows a predetermined strategy, ideally taking into account the amount of variation in the model mix from one PVT solution to the next, as a gauge of the confidence that acceptable solutions can be provided in the power down interval (i.e. without pseudorange measurements during the power down interval). As already mentioned, if the model mix varies only a little (so that a parameter measuring its variation is less than a predetermined minimum tolerance value), the fraction of the duty cycle in which the power is off is increased, and conversely, if the model mix varies substantially (so that a parameter measuring its variation is more than a predetermined maximum tolerance value).

Still referring to FIG. 3, in a next, decision step 36, the GPS receiver determines whether or not it is time, according to the duty cycle, to perform another pseudorange measurement. If so, then in a next, decision step 37, the GPS receiver determines whether any of the satellite signals are now lost. If so, then in a next step 38 the GPS receiver attempts to reacquire the signals using the last PVT solution to provide estimates for carrier frequency and code phase. Finally, and regardless of whether any GPS signal has been lost, in a last step 39 the GPS receiver performs another pseudorange measurement (i.e. the RF front end 11 and the baseband processor 14 are activated to perform another determination of pseudorange information).

In practicing the invention, it is useful to view a partial duty cycle as scalable. In other words, a partial duty cycle indicating the fraction of time the GPS receiver is in operation (in that it is providing PVT solutions, i.e. solutions indicating the state of its motion) should be defined by defining a scale factor which is adjusted up or down to control the fraction of time selected components of the receiver (such as the RF front end 11 or the baseband processor 14) are powered off. Then based on monitoring the variation in the model mix used by the MCU 15 as indicated according to a predetermined metric, the scaling factor is adjusted up or down. A metric for assigning a value to the change in the model mix could be e.g. the average of the change value in the last three model mixes, each change value is made prohibitively large if a different model is introduced than was used in the previous computation and otherwise assigned a value equal to the difference between the two model mixes divided by the sum of the two model mixes.

The invention comprehends different ways of shutting down components of a GPS receiver to save power (without significantly degrading performance of the GPS receiver function because of continuing to provide user PVT solutions even during each shutdown period). For example, the hardware used to provide any channels not being used to track satellites because of a poor local constellation (i.e. a constellation of satellites not providing strong signals from the number required for a PVT solution) can be powered-down, and then not powered back up until the local constellation improves.

Another way to effectively power down some components of a GPS receiver to save power is to, instead of actually powering down any components, run the GPS receiver hardware at a lower frequency (i.e. make pseudorange measurements less often).

Yet another way to save power is to shut down the GPS receiver front end (the components used to acquire the GPS satellite signals), and operate only the tracking loops (which allows fast reacquisition) (assuming the tracking loops are executed by the MCU 15, not in the baseband processor 14). Knowing the current mix of the motion models, the outcome of the tracking loops can be predicted or estimated pretty accurately and the prediction can be used in the tracking loops as initial values, when needed. It does not matter whether the actual signals are lost, since it is possible to estimate the raw measurements for a while. The more accurate the prediction is, the longer the power-down period can be.

The invention also comprehends varying the fraction of time any of the components of the GPS receiver are shut down, depending on how close the predicted user PVT is to the measured position. In other words, in the preferred embodiment and as indicated above in connection with FIG. 3, the invention also comprehends adapting the shut down period to the detected motion of the observer so that e.g. a motion not in good accord with the combination of models being used would prompt a shortening of the shut down period, and a motion in very good accord would prompt a lengthening of the shut down period.

Of course operating a GPS receiver according to the invention does have some costs, including a slightly degraded positioning accuracy and a minor increase in the complexity of the interface of the MCU to the baseband processor. (Accuracy is degraded from optimum by only as much as allowed by the system. If required accuracy is 10 m, and full operation accuracy is 5 m, then the accuracy can be allowed to degrade by 5 m to provide power saving.)

Scope of the Invention

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A method for conserving power in a positioning system receiver used in connection with a positioning system providing ranging signals, the receiver using the ranging signals to determine a state of motion of the receiver, the method comprising:

a) a step (32) of performing at least a predetermined number of solutions of the state of motion of the receiver using a filter solution based on a mix of models of the motion of the receiver, a mix that is varied from one solution to the next according to a predetermined criteria, and of providing the model mix used in each solution; and b) a step (35) of adopting a partial duty cycle indicating a percentage of time selected receiver components are powered off, the percentage of time based on the mix of models used in successive solutions;

wherein the step (32) of performing at least a predetermined number of solutions of the state of motion of the receiver is performed at least once during a time in the partial duty cycle when the selected receiver components are powered off.

2. The method of claim 1, wherein the receiver includes a radiofrequency (RF) front end module and a baseband processor module and further wherein the selected components include the RF front end module.

3. The method of claim 2, wherein the selected components also include the baseband processor module.

4. An apparatus for conserving power in a positioning system receiver used in connection with a positioning system providing ranging signals, the receiver using the ranging signals to determine a state of motion of the receiver, the apparatus comprising:

a) means (15) for performing at least a predetermined number of solutions of the state of motion of the receiver using a filter solution based on a mix of models of the motion of the receiver that are varied from one solution to the next according to a predetermined criteria, and for providing the model mix used in each solution; and b) means (18) for determining a partial duty cycle indicating a percentage of time selected receiver components are powered off, the percentage of time based on the mix of models used in successive solutions;

wherein the means (32) for performing at least a predetermined number of solutions of the state of motion of the receiver is operative during a time in the partial duty cycle when the selected receiver components are powered off.

5. The apparatus of claim 4, wherein the receiver includes a radiofrequency (RF) front end module and a baseband processor module and further wherein the selected components include the RF front end module.

6. The apparatus of claim 5, wherein the selected components also include the baseband processor module.

7. A system, including: a transmitter for transmitting a ranging signal, and a ranging receiver for receiving the ranging signal and for determining a state of motion of the ranging receiver, the ranging receiver characterized in that it includes an apparatus for conserving power that in turn comprises:

a) means (15) for performing at least a predetermined number of solutions of the state of motion of the ranging receiver using a filter solution based on a mix of models of the motion of the ranging receiver that are varied from one solution to the next according to a predetermined criteria, and for providing the model mix used in each solution; and b) means (18) for determining a partial duty cycle indicating a percentage of time selected ranging receiver components are powered off, the percentage of time based on the mix of models used in successive solutions;

wherein the means (32) for performing at least a predetermined number of solutions of the state of motion of the receiver is operative during a time in the partial duty cycle when the selected receiver components are powered off.

8. The system as in claim 7, further comprising a computing resource external to the ranging receiver, and wherein the apparatus communicates information to the computing facility via a wireless communication system and the computing facility uses the information in assisting the apparatus in performing at least a predetermined number of solutions of the state of motion of the ranging receiver using a filter solution based on a mix of models of the motion of the ranging receiver that are varied from one solution to the next according to a predetermined criteria.

* * * * *